US010502257B2

United States Patent
Sato

(10) Patent No.: US 10,502,257 B2
(45) Date of Patent: Dec. 10, 2019

(54) DUST COVER

(71) Applicant: NOK CORPORATION, Tokyo (JP)

(72) Inventor: Norihito Sato, Makinohara (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/764,338

(22) PCT Filed: Sep. 6, 2016

(86) PCT No.: PCT/JP2016/076071
§ 371 (c)(1),
(2) Date: Mar. 29, 2018

(87) PCT Pub. No.: WO2017/061212
PCT Pub. Date: Apr. 13, 2017

(65) Prior Publication Data
US 2018/0274584 A1 Sep. 27, 2018

(30) Foreign Application Priority Data

Oct. 5, 2015 (JP) ................................ 2015-197740

(51) Int. Cl.
F16C 11/06 (2006.01)
F16J 15/52 (2006.01)

(52) U.S. Cl.
CPC ................ F16C 11/0671 (2013.01)

(58) Field of Classification Search
CPC .. F16C 11/0671; F16C 11/110676; F16J 3/04; F16J 3/041; F16J 3/042
See application file for complete search history.

(56) References Cited

U.S. PATENT DOCUMENTS

2015/0030376 A1    1/2015  Shimazawa
2017/0234361 A1*   8/2017  Hosen ................. F16J 3/04
                                              403/134
(Continued)

FOREIGN PATENT DOCUMENTS

JP    S56-056918 U    5/1981
JP    H08-159146 A    6/1996
(Continued)

OTHER PUBLICATIONS

Japanese Office Action dated Jan. 8, 2019 (corresponding to JP 2017-544420).
(Continued)

Primary Examiner — Gilbert Y Lee
(74) Attorney, Agent, or Firm — Harness, Dickey & Pierce, P.L.C.

(57) ABSTRACT

A dust cover that allows a dust lip part thereof to offer sealing performance stably for a long period of time. A sealing part 130 includes an inner peripheral sealing part that can slide relative to an outer peripheral surface of a shaft part, and a dust lip part 132 that can slide relative to an end surface of a knuckle 400, wherein an annular protrusion 135 that protrudes radially outward is formed at an end of the sealing part 130 on the other end side, and at least one of inner and outer peripheral surfaces of the dust lip part 132 extends toward the other end side from recessed parts 132a and 132b of the sealing part 130 being recessed toward one end side with respect to an end surface 135a of the annular protrusion 135 on the other end side.

4 Claims, 5 Drawing Sheets

(56) References Cited

U.S. PATENT DOCUMENTS

2018/0347621 A1* 12/2018 Hirota .................. F16J 3/04
2019/0078612 A1*  3/2019 Hirota .............. F16C 11/0671
2019/0085894 A1*  3/2019 Kanagawa ......... F16C 11/0623
2019/0154078 A1*  5/2019 Hosen .................. F16J 3/04

FOREIGN PATENT DOCUMENTS

| JP | H08-200517 A | | 8/1996 | |
| --- | --- | --- | --- | --- |
| JP | 2011085257 A | * | 4/2011 | .......... F16C 11/0671 |
| WO | 2014/020980 A1 | | 2/2014 | |
| WO | WO-2015186441 A1 | * | 12/2015 | ............... F16J 3/042 |
| WO | WO-2017077998 A1 | * | 5/2017 | ................. F16J 3/04 |

OTHER PUBLICATIONS

Extended European Search Report dated Jun. 7, 2019 (corresponding to EP16853366.9).

* cited by examiner

DUST COVER

CROSS-REFERENCE TO RELATED APPLICATIONS

This application is a National Stage of International Application No. PCT/JP2016/076071, filed Sep. 6, 2016 (now WO 2017/061212A1), which claims priority to Japanese Application No. 2015-197740, filed Oct. 5, 2015. The entire disclosures of each of the above applications are incorporated herein by reference.

FIELD

The present disclosure relates to a dust cover for use in a ball joint provided in various kinds of equipment in a vehicle or the like.

BACKGROUND

A dust cover has been used in a conventional ball joint provided in various kinds of equipment in a vehicle or the like in order to prevent water or dust from coming into a joint part and prevent grease from flowing out from the joint part. With reference to FIGS. 4 and 5, an exemplary conventional dust cover will be described. FIG. 4 is a schematic sectional view of the exemplary conventional dust cover. FIG. 5 is a partly enlarged sectional view of the exemplary conventional dust cover (a sectional view showing a sealing part thereof in an enlarged state).

The ball joint includes a ball stud having a spherical part at an end of a shaft part thereof and a socket that supports the ball stud in a rotatable and swingable manner. The ball stud is attached to a knuckle or the like provided at a vehicle body.

A dust cover 800 includes a deformable film-like body part 810, a fixed part 820 provided on one end side of the body part 810 and fixed to the socket, and a sealing part 830 provided on the other end side of the body part 810. Here, the sealing part 830 includes an inner peripheral sealing part 831 which is swingably provided at the shaft part of the ball stud and a dust lip part 832 which is provided slidably relative to the knuckle. In the illustrated conventional example, an annular groove 834 to which a snap ring is mounted is provided on an outer peripheral surface of the dust cover at a portion where the sealing part 830 is provided. Therefore, an annular protrusion 835 that protrudes radially outward is formed between an end surface of the sealing part 830 on the other end side and the annular groove 834.

In recent years, as the ball joint has been reduced in size, an area of a surface with which the dust lip part 832 comes into close contact (such as an end surface of the knuckle) may be reduced. The dust lip part 832 is shortened to cope with the reduction. However, it is difficult to keep the shortened dust lip part 832 in close contact with the knuckle in a stable manner. The dust lip part 832 deforms to be curved in the direction indicated by the arrow R in FIG. 5 to come into close contact with the knuckle, and the shortened dust lip part 832 has a greater curvature, which may cause stress to concentrate on the base part of the dust lip part 832. This lowers the durability. In particular, in a configuration in which the annular protrusion 835 must be provided at an end of the sealing part 830 on the other end side as in the illustrated conventional example, the outer peripheral surface of the dust lip part 832 is shortened, and the above described disadvantage becomes more significant.

CITATION LIST

Patent Literature

[PTL 1] Japanese Patent Application Publication No. H08-159146

SUMMARY

Technical Problem

It is an object of the present disclosure to provide a dust cover that allows a dust lip part thereof to offer sealing performance stably for a long period of time.

Solution to Problem

According to the disclosure, the following means is adopted to solve the problem.

More specifically, a dust cover according to the present disclosure is for use in a ball joint including a ball stud having a spherical part at one end of a shaft part thereof, a socket that has a bearing for the spherical part and supports the ball stud in a rotatable and swingable manner, and a coupling member that couples with the shaft part on a side of the shaft part opposite to the spherical part, the dust cover includes: a deformable body part, a fixed part provided on one end side of the body part and fixed to the socket, and a sealing part provided on the other end side of the body part and provided slidably relative to the shaft part and the coupling member, the sealing part includes: an inner peripheral sealing part that can slide relative to an outer peripheral surface of the shaft part (which may include the shaft part itself of the ball stud or another member provided on the outer peripheral surface side of the shaft, which similarly applies hereinafter) and a dust lip part that can slide relative to an end surface of the coupling member, wherein an annular protrusion that protrudes radially outward is formed at an end of the sealing part on the other end side, and at least one of outer and inner peripheral surfaces of the dust lip part extends toward the other end side from a recessed part of the sealing part being recessed toward the one end side with respect to an end surface of the annular protrusion on the other end side.

According to the present disclosure, at least one of the outer and inner peripheral surfaces of the dust lip part can be prolonged as compared to the configuration in which the dust lip part extends toward the other end side from the position of the end surface of the annular protrusion on the other end side. Thus a curvature of the dust lip part that deforms to be curved when coming into close contact with the coupling member may be reduced. Therefore, the concentration of stress on a base part of the dust lip part or the like may be suppressed. In addition, the dust lip part can stably be in close contact with the coupling member.

An annular groove may be provided on an outer peripheral surface of the dust cover at a portion where the sealing part is provided, and the annular protrusion may be formed as a portion of the dust cover between an end surface of the sealing part on the other end side and the annular groove.

Advantageous Effects of the Disclosure

As described above, according to the present disclosure, the sealing performance by the dust lip part can be offered stably for a long period of time.

DRAWINGS

DETAILED DESCRIPTION

Now, a mode for carrying out the disclosure will be described in detail on the basis of an embodiment in conjunction with the accompanying drawings. Note however that the sizes, materials, shapes, and positional arrangement of components in the following description of the embodiment should not be construed as limiting the scope of the disclosure unless otherwise specified.

(Embodiment)

Figure 1:
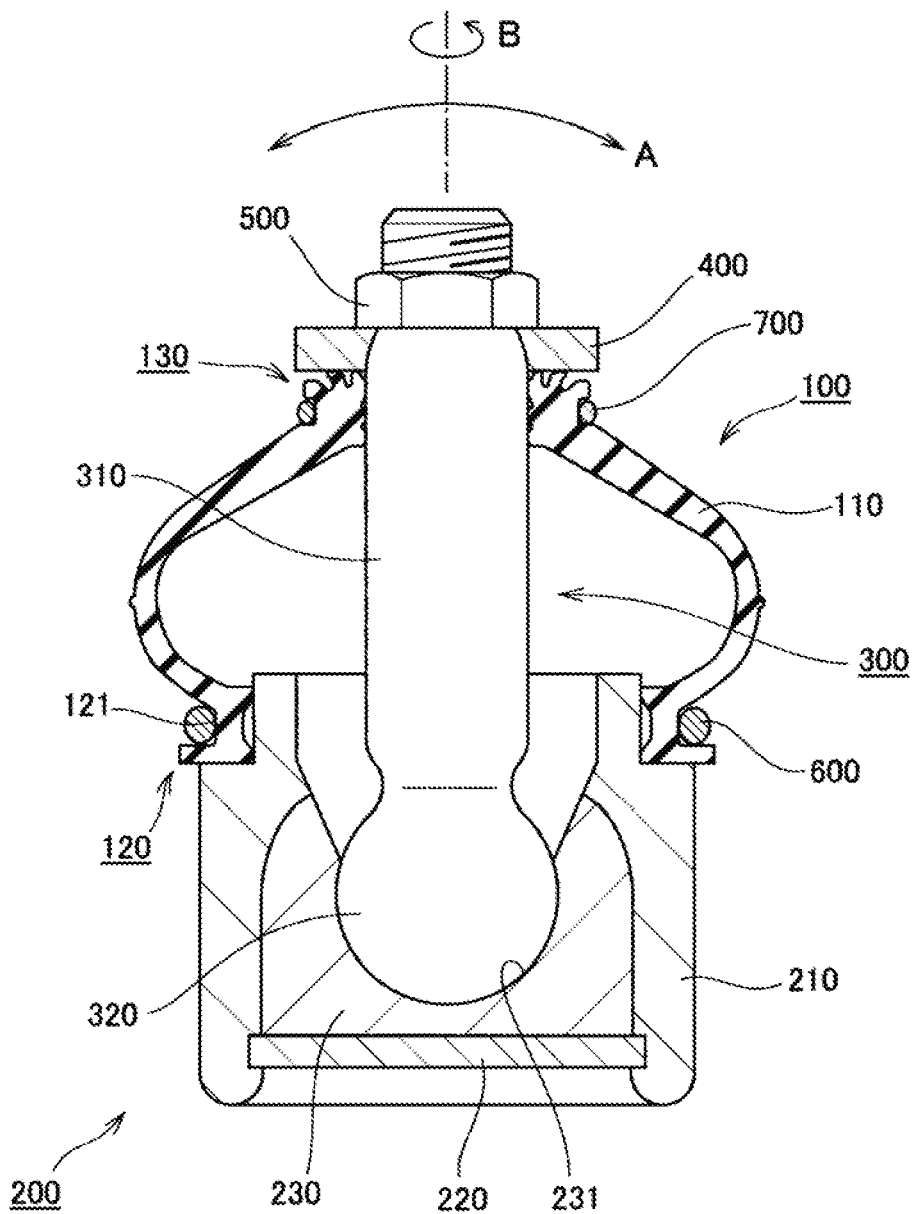
FIG. 1 is a schematic sectional view of a ball joint and a dust cover mounted to the ball joint according to an embodiment of the present disclosure.
Figure 2:
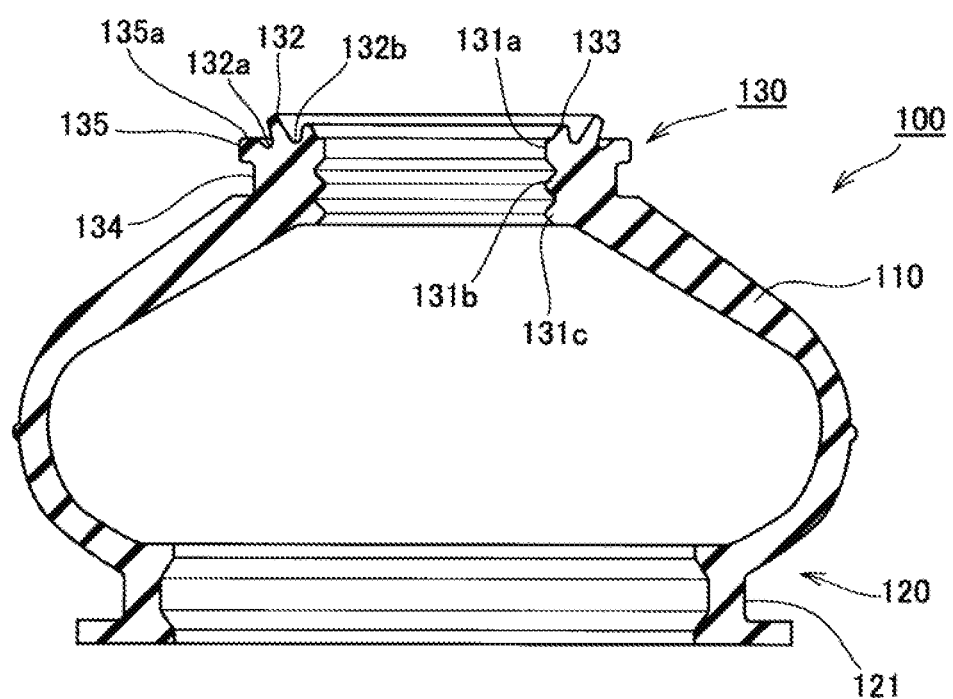
FIG. 2 is a schematic sectional view of the dust cover according to the embodiment of the present disclosure.
Figure 3:
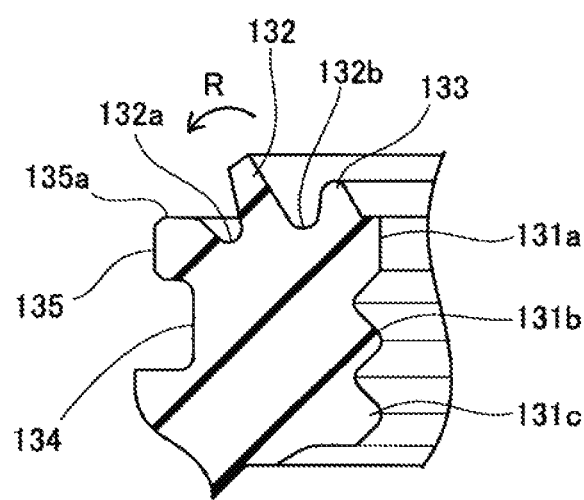
FIG. 3 is a partly enlarged sectional view of the dust cover according to the embodiment of the present disclosure (an enlarged sectional view of a sealing part).
Figure 4:
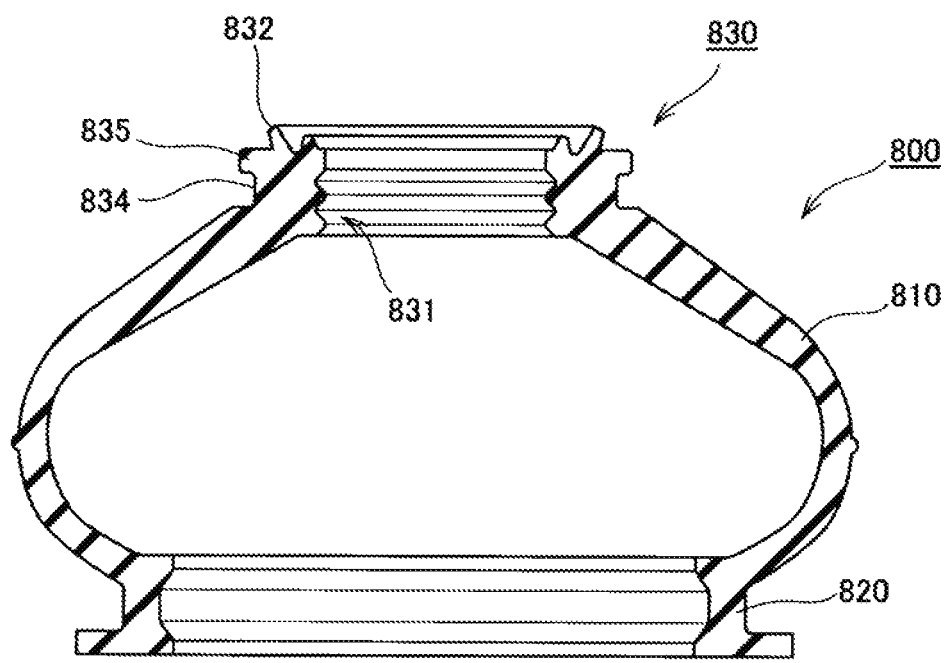
FIG. 4 is a schematic sectional view of a dust cover according to a conventional example.
Figure 5:
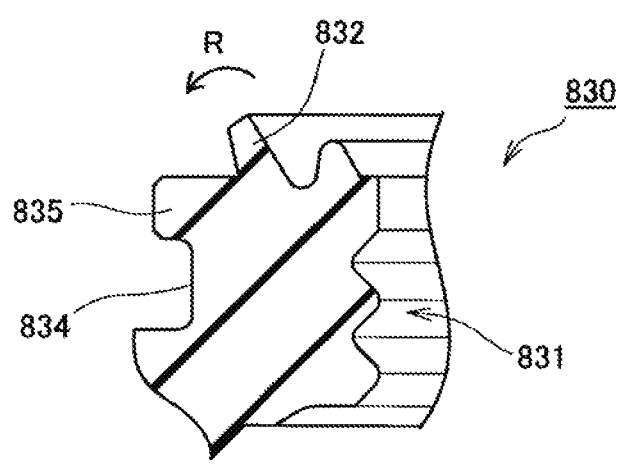
FIG. 5 is a partly enlarged sectional view of the dust cover according to the conventional example (an enlarged sectional view of a sealing part).

With reference to FIGS. 1 to 3, a dust cover according to an embodiment of the present disclosure will be described. FIG. 1 is a schematic sectional view of a ball joint and a dust cover mounted to the ball joint according to the embodiment of the present disclosure. Note that FIG. 1 is a sectional view taken along a plane including a central axis line of a shaft part of a ball stud provided in the ball joint. FIG. 2 is a schematic sectional view of the dust cover according to the embodiment of the present disclosure. Note that FIG. 2 is a sectional view taken along a plane including the central axis line of the dust cover, which has an annular shape, in an undeformed state. FIG. 3 is a partly enlarged view of FIG. 2 and an enlarged sectional view of a sealing part.

<Ball Joint>

With reference to FIG. 1 in particular, an exemplary ball joint over which the dust cover 100 according to the embodiment can appropriately be used will be described. The ball joint includes a ball stud 300 having a spherical part 320 at one end of a shaft part 310, a socket 200 that supports the ball stud 300 in a rotatable and swingable manner, and a knuckle 400 as a coupling member that couples with the shaft part 310 on a side of the shaft part 310 opposite to the spherical part 320. The socket 200 includes an annular case 210, a base plate 220 fixed to the bottom side of the case 210, and a bearing 230 for the spherical part 320. The bearing 230 has a bearing surface 231 formed by a spherical surface having the same radius of curvature as that of the spherical part 320. The knuckle 400 is provided in a vehicle body or the like and the shaft part 310 of the ball stud 300 is fixed to the knuckle 400 by a nut 500. Note that the tip end of the shaft part 310 is externally threaded.

The dust cover 100 is used to prevent water or dust from coming into a joint part and grease from flowing out from the joint part.

<Dust Cover>

An overall configuration of the dust cover 100 will be described. The dust cover 100 is made of an elastic material such as rubber. The dust cover 100 has, in an integral form, an annular film-like deformable body part 110, a fixed part 120 provided on one end side of the body part 110 and fixed to the socket 200, and a sealing part 130 provided on the other end side of the body part 110.

In the dust cover 100 having the above-described configuration, when the ball stud 300 swings relative to the socket 200 (swings in the direction indicated by the arrow A), the body part 110 deforms. When the ball stud 300 rotates relative to the socket 200 (rotates in the direction indicated by the arrow B), the sealing part 130 slides relative to the shaft part 310 of the ball stud 300 and the knuckle 400. Thus the dust cover 100 performs a sealing function even when the ball stud 300 swings or rotates relative to the socket 200.

<<Fixed Part>>

An annular groove 121 is provided on an outer peripheral surface of the fixed part 120. Attaching a snap ring (circlip) 600 to the annular groove 121 allows the inner peripheral surface of the fixed part 120 to come into close contact with the case 210 of the socket 200. Thus, water and dust etc. can be prevented from coming into the joint part from a portion between the fixed part 120 and the socket 200 and grease from flowing out from the joint part.

<<Seal Part>>

The sealing part 130 according to the embodiment will be described in more detail. The sealing part 130 includes an inner peripheral sealing part that can slide relative to an outer peripheral surface of the shaft part 310 of the ball stud 300 and a dust lip part 132 that can slide relative to an end surface of the knuckle 400 as a coupling member. The inner peripheral sealing part according to the embodiment includes three annular protrusions 131a, 131b and 131c that protrude radially inwardly. Note however that the configuration of the inner peripheral sealing part is not limited to the above. For example, the inner peripheral sealing part may include one or two annular protrusions.

The dust lip part 132 includes a part inclined radially outwardly and toward the end surface of the knuckle 400. Furthermore, according to the embodiment, an auxiliary dust sealing part 133 is provided on the radially inner side of the dust lip part 132. The auxiliary dust sealing part 133 is also configured to be slidable relative to the end surface of the knuckle 400 and serves to restrain entry of dust.

An annular protrusion 135 that protrudes radially outward is formed at an end of the sealing part 130 on the other end side in the sealing part 130 according to the embodiment. An annular groove 134 is provided on an outer peripheral surface of the dust cover 100 at a portion where the sealing part 130 is provided. Therefore, the annular protrusion 135 is a portion of the dust cover between the end surface of the sealing part 130 on the other end side and the annular groove 134. Attaching a snap ring (circlip) 700 to the annular groove 134 allows the inner peripheral surface of the inner peripheral sealing part (annular protrusions 131a, 131b and 131c) to come into close contact with the outer peripheral surface of the shaft part 310 of the ball stud 300.

The inner and outer peripheral surfaces of the dust lip part 132 according to the embodiment are configured to extend toward the other end side from parts 132a and 132b that are recessed toward one end side of the annular protrusion 135 with respect to the end surface 135a on the other end side.

<Advantageous Features of Dust Cover According to Embodiment>

As in the foregoing, with the dust cover 100 according to the embodiment, the inner and outer peripheral surfaces of the dust lip part 132 can have greater lengths than those in the conventional configuration in which the dust lip part extends toward the other end side from the position of the end surface of the annular protrusion on the other end side. Thus the dust lip part 132 that deforms to be curved when coming into close contact with the knuckle 400 may have a smaller curvature. More specifically, when coming into contact with the knuckle 400, the dust lip part 132 deforms to be curved in the direction indicated by the arrow R in FIG. 3. The dust lip part 132 can deform mildly because of the prolonged outer and inner peripheral surfaces of the dust lip part 132. Therefore, the concentration of stress on the base part of the dust lip part 132 or the like can be suppressed. The movable range of the dust lip part 132 increases, and therefore the dust lip part 132 may have increased following capability as the ball stud 300 swings relative to the socket 200. Therefore, the dust lip part 132 can be in close contact with the knuckle 400 in a stable manner. Consequently, with the dust cover 100 according to the embodiment, the sealing performance by the dust lip part 132 can be kept stable for a long period of time.

(Other Features)

According to the embodiment described above, the inner and outer peripheral surfaces of the dust lip part 132 are configured to extend toward the other end side from the parts 132a and 132b which are recessed toward one end side of the annular protrusion 135 with respect to the end surface 135a on the other end side. However, according to the present disclosure, either inner or outer peripheral surfaces of the dust lip part 132 may be configured to extend toward the other end side from the part which is recessed toward one end side of the annular protrusion 135 with respect to the end surface on the other end side. Since the advantageous effects as described above can still be achieved to some extent even in this configuration, the configuration may be used depending on usage condition.

Furthermore, according to the embodiment, the knuckle 400 is the coupling member (which couples with the shaft part 310 on the side of the shaft part 310 opposite to the spherical part 320) as a member on which the dust lip part 132 slides. However, according to the present disclosure, the coupling member is not limited to the knuckle 400. For example, as disclosed in Japanese Patent Application Publication No. H11-63245, the present disclosure may be applied to a configuration in which a ferrule coupling with a shaft part is provided as a coupling member.

In addition, according to the embodiment, the inner peripheral sealing part directly slides relative to the outer peripheral surface of the shaft part 310 of the ball stud 300. However, the present disclosure may be applied to a configuration in which an inner peripheral sealing part is configured to be slidable relative to an outer peripheral surface of another member fixed to a shaft part of a ball stud. For example, as disclosed in Japanese Patent Application Publication No. H11-63245, the present disclosure may be applied to a configuration in which an inner peripheral sealing part is configured to slide relative to a ferrule.

REFERENCE SIGNS LIST

100 Dust cover
110 Body part
120 Fixed part
121 Annular groove
130 Sealing part
131a, 131b, 131c Annular protrusion
132 Dust lip part
132a, 132b Recessed part
133 Auxiliary dust sealing part
134 Annular groove
135 Annular protrusion
135a End surface
200 Socket
210 Case
220 Base plate
230 Bearing
231 Bearing surface
300 Ball stud
310 Shaft part
320 Spherical part
400 Knuckle
500 Nut
600, 700 Snap ring (circlip)

The invention claimed is:

1. A dust cover for use in a ball joint including a ball stud having a spherical part at one end of a shaft part thereof, a socket that has a bearing for the spherical part and supports the ball stud in a rotatable and swingable manner, and a coupling member that couples with the shaft part on a side of the shaft part opposite to the spherical part, the dust cover comprising:

a deformable body part;

a fixed part provided on one end side of the body part and fixed to the socket; and a sealing part provided on the other end side of the body part and provided slidably relative to the shaft part and the coupling member, the sealing part including:

an inner peripheral sealing part that can slide relative to an outer peripheral surface of the shaft part; and a dust lip part that is configured to be inclined radially outwardly and toward the other end side, and that can slide relative to an end surface of the coupling member, wherein an annular protrusion that protrudes radially outward is formed at an end of the sealing part on the other end side, and an outer peripheral surface of the dust lip part extends toward the other end side from a recessed part of the sealing part being recessed axially toward the one end side with respect to an end surface of the annular protrusion on the other end side, wherein the dust lip part extends axially toward the other end side to a greater extent than the end surface of the annular protrusion.

2. The dust cover according to claim 1, wherein an annular groove is provided on an outer peripheral surface of the dust cover at a portion where the sealing part is provided, and the annular protrusion is a portion of the dust cover between an end surface of the sealing part on the other end side and the annular groove.

3. The dust cover according to claim 1, wherein an inner peripheral surface of the dust lip part extends toward the other end side from a recessed part of the sealing part being recessed toward the one end side with respect to the end surface of the annular protrusion on the other end side.

4. The dust cover according to claim 2, wherein an inner peripheral surface of the dust lip part extends toward the other end side from a recessed part of the sealing part being recessed toward the one end side with respect to the end surface of the annular protrusion on the other end side.

\* \* \* \* \*